United States Patent [19]

Gilley

[11] 4,056,848
[45] Nov. 1, 1977

[54] MEMORY UTILIZATION SYSTEM

[76] Inventor: George C. Gilley, 21730 Redbeam Ave., Torrance, Calif. 90503

[21] Appl. No.: 709,139

[22] Filed: July 27, 1976

[51] Int. Cl.$^2$ .......................... G11C 9/06; G11C 7/00
[52] U.S. Cl. .................................... 364/200; 364/900
[58] Field of Search ....................... 445/1; 340/172.5; 364/200, 900

[56] References Cited

U.S. PATENT DOCUMENTS

| | | | |
|---|---|---|---|
| 3,577,185 | 5/1971 | Belady | 340/172.5 |
| 3,588,839 | 6/1971 | Belady et al. | 340/172.5 |
| 3,611,315 | 10/1971 | Murano | 340/172.5 |
| 3,705,388 | 12/1972 | Nishimoto | 340/172.5 |
| 3,806,888 | 4/1974 | Brickman et al. | 340/172.5 |
| 3,878,513 | 4/1975 | Werner | 340/172.5 |
| 3,889,241 | 6/1975 | Cordi et al. | 340/172.5 |
| 3,916,382 | 10/1975 | Martin et al. | 340/172.5 |
| 3,921,153 | 11/1975 | Belady et al. | 340/172.5 |
| Re. 26,919 | 6/1970 | Hagelbarger et al. | 340/172.5 |

*Primary Examiner*—Mark E. Nusbaum

[57] ABSTRACT

An apparatus is provided which allows computer programs to execute directly out of a large, sector addressable secondary memory by utilizing a relatively small, word addressable buffer memory. The system includes circuitry adapted to selectively transfer data between the secondary memory and the buffer memory so that a memory word request by the computational unit will result in either transferring the word from the buffer memory to the computational unit if the word is present in the buffer memory or transferring the data sector in which the requested word resides into buffer memory from secondary memory. The circuitry selectively transfers data sectors between the secondary and the buffer memory to continually maintain the data sector containing the addressed word and a predetermined number of directly adjacent data sectors from secondary memory in a portion of the buffer memory. In this manner, the requested word is located in the buffer memory along with data which is physically located on either side of the requested word in secondary memory. A data sector may consist of one or more data words.

19 Claims, 3 Drawing Figures

MEMORY UTILIZATION SYSTEM

BACKGROUND OF THE INVENTION

A continuing problem facing computer designers is the need to minimize the cost of computer memory without increasing the access time required to locate desired data. Memory devices from which computer programs derive direct data are sometimes called main or primary memories, and as such must be capable of providing data in the smallest usable increments, called words. Secondary memory storage devices, such as magnetic drums, disks or tapes, can store large quantities of data but usually provide data to the primary memory and only in blocks or sectors containing a plurality of words. The main or primary memory devices are considerably more expensive than the secondary memory devices on a cost per word stored basis. However, when the size of the primary memory is decreased and more secondary memory is utilized for data storage, the time required for utilization of the requested word increases due to transfer of the data from secondary memory to primary memory, thus requiring more computer time to perform a given calculation.

In an attempt to minimize the cost of the primary memory by reducing its capacity while at the same time maintaining high speed computational capability, computer designers have developed elaborate paging and segmentation systems which attempt to divide a program into sections so that only certain parts of the stored data are required to be in the primary memory at any given time. In the segmentation approach, expensive mapping hardware and/or system software are required to transfer segments of data between primary memory and secondary memory and to keep track of the segment location and its usage. Often a large part of primary memory is required just to manage the transfer of the data segments. Paging is similar to segmentation except that the data segment sizes are always the same. Again, considerable software and hardware are required to store and manipulate the page directories. Further, relatively large main memories are still required with these memory management schemes.

This invention eliminates the high cost associated with the conventional approaches to memory management outlined above. The cost of primary memory is reduced by providing means for programs to execute directly out of secondary memory with the aid of a relatively small primary memory and associated circuitry. The manner in which the secondary memory is utilized and controlled eliminates the need for elaborate paging or segmentation systems and their attendant high hardware and software costs. This invention allows the above economies to be effected without any changes in the program which is being executed and with substantially the same speed of execution. Thus, the primary and secondary memory combination of this invention functions substantially as one large, primary memory as far as the computer program being executed is concerned, but at much less cost.

SUMMARY OF THE INVENTION

A memory utilization apparatus is provided for transferring data between a first data storage device which is directly accessible to a processing unit of a computing device and a second data storage device accessible to the said processing unit through the first data storage device. The apparatus comprises the first data storage device, the second data storage device, and control means adapted to receive requests for data from the processing unit and to transfer the requested data from the second data storage device to the first data storage device for access by the processing unit whenever the data requested is not then present in the first data storage device. The control means includes means for automatically transferring to the first data storage device, in the same position relative to the requested data, as was existant in the second data storage device, additional portions of data from the second data storage device which were adjacent to the requested data.

In one embodiment of the invention, the first data storage device consists of a word addressable primary main memory, the second data storage device consists of a block or sector addressable secondary main memory, and the control means which has two components comprising a data transfer means or Controller, which executes data transfers between the primary main memory and secondary main memory, and a sequencing means or Memory Expander, which regulates the operation of the primary main memory, the secondary main memory, and the Controller in accordance with data requests from a central processing unit of a computing device. When the central processing unit requests a data word from the memory system, the Memory Expander first determines from the data address if that word is present within the primary main memory. If so, the word is immediately transferred by the Memory Expander to the central processing unit. If the word is not present in primary main memory, then the Memory Expander causes the Controller to transfer the appropriate block or sector containing the requested word from the secondary main memory to the primary main memory from which it can then be transferred to the central processing unit. A sector as used herein is a grouping of one or more data words, with the grouping not to contain more data words than the total capacity of primary main memory. The transfer of succeeding sectors from secondary main memory into primary main memory will continue until the capacity of primary main memory is reached, or until data is requested which is not in primary main memory or will not be transferred into primary main memory within a given number of sectors. Access to data present in primary main memory is unaffected by the transfer of succeeding sectors into primary main memory.

This embodiment of the invention also includes means for "centering" in primary main memory the sector containing the last requested data between sectors transferred from secondary main memory which immediately preceded and followed the requested sector. This "centering" is accomplished at the appropriate time by the Memory Expander transferring the adjacent sectors from secondary main memory to primary main memory and continues as long as each subsequent request is for data currently or soon to be residing within primary main memory.

BRIEF DESCRIPTION OF THE DRAWINGS

The invention may best be understood when considered in light of the following detailed description taken in conjunction with the accompanying drawings, wherein.

DESCRIPTION OF THE INVENTION

Figure 1:
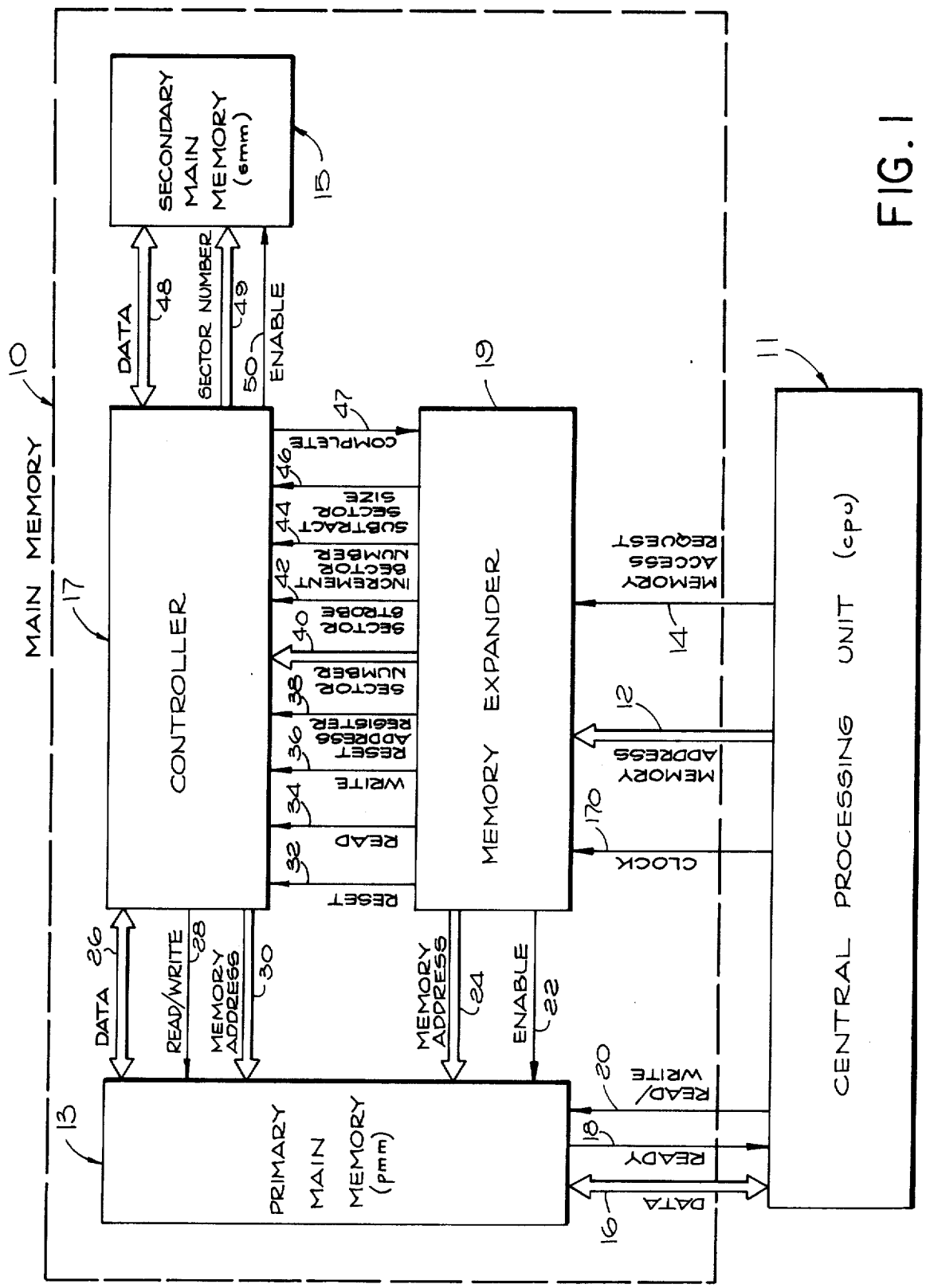
FIG. 1 is a block diagram showing various components of the apparatus of one embodiment of this invention and the interfaces between them.

In accordance with the premise that after a given data request is satisfied, the next data requested will be in a sector on one side of and near to the previously utilized sector, this invention utilizes a relatively small, word addressable primary main memory 13 as a window into a block or sector addressable secondary main memory 15. This window is continually being centered about the sector containing the last data word requested. A request for a data word which is not within the window immediately causes the window to shift to the appropriate location in secondary memory by transferring data sectors from secondary main memory into primary main memory. This shifting is entirely automatic, does not require any changes to the program being executed, and makes the primary and secondary main memory combination appear to the central processing unit 11 to function as one large word addressable primary memory.

I. INTERFACES

Specifically, the Central Processing Unit (CPU) 11 is typical of a modern computer system which employs a memory for storing and retrieving information and a processing unit for utilizing information contained within the memory. The items within Main Memory 10 appear collectively to the CPU 11 as one word-addressable main memory. The Main Memory 10 consists of a Primary Main Memory (PMM) 13, a Secondary Main Memory (SMM) 15, a Controller 17, and a Memory Expander 19. The PMM 13 may be any word addressable memory, such as the core or semiconductor memories presently employed with most commercially available digital computers. The SMM 15 may be any addressable memory, such as the disks, drums, or magnetic bubble arrays currently available, employed to store blocks or sectors. A sector is used herein to mean a grouping of one or more words. The Controller 17 provides the interface between the PMM 13, SMM 15, and the Memory Expander 19. The Controller 17 consists of conventional logic circuitry and functions as do most direct memory access controllers presently employed with commercially available sector addressable secondary storage units. This invention relates primarily to the design of the Memory Expander 19 and the manner in which it utilizes the PMM 13, SMM 15, and Controller 17 to function together as though they were a single main memory addressable to the word level by the CPU 11.

The CPU 11 has three interfaces with the Memory Expander 19, the Memory Address lines 12, a Memory Access Request line 14, and a Clock line 170. The Memory address, as used herein, is defined as an $(n+1)$ digit, zero origin, leftward indexing Vector X where $X = x_n \ldots x_k \ldots x_j \ldots x_o$. There are $n+1$ Memory Address lines 12 which in this binary system allow $2^{n+1}$ words of memory to be directly addressable. The Memory Access Request line 14 is required to carry a signal from the CPU 11 indicating that a memory access is requested. The clock 170 supplies the basic timing frequency which is utilized by the Memory Expander 19 in the generation of its output signals to the Controller 17 and PMM 13.

The interface between the CPU 11 and the PMM 13 consists of a set of Data Lines 16, a single Ready line 18, and a Read/Write control line 20 to carry a signal indicating whether a Read or a Write access is required. Two embodiments are described hereinafter, the first concerning a Read Only Memory (ROM) wherein data is transferred only from the PMM 13 to the CPU 11. In the ROM embodiment, only the Read signal is meaningful. The second embodiment concerns a Read/Write Memory (RWM) wherein data is not only transferred from the PMM 13 to the CPU 11 for further processing, but in addition data present in the CPU 11 can be transferred into the PMM 13 for storage and subsequent retrieval. The transfer of data from the CPU 11 to PMM 13 is the Write operation. In the RWM configuration, both the Read and Write signals are meaningful. The number of Data lines 16 is determined by the word size requirements of the CPU 11. The Ready line 18 carries a Ready signal which indicates when the PMM 13 is ready to either send a data word to or receive a data word from the CPU 11 by way of the Data lines 16.

The interface between the Memory Expander 19 and the PMM 13 consists of an Enable line 22 and a set of $k+1$ Memory Address lines 24. An Enable signal is generated by the Memory Expander 19 after a memory address request by the CPU 11 as soon as the Memory Expander 19 has determined that the requested word is present within PMM 13.

The interface between the PMM 13 and the Controller 17 consists of a set of Data lines 26, a Read/Write control line 28, and a set of $k+1$ Memory Address lines 30. The data path between the PMM 13 and the Controller 17 may contain more than one word at a time.

The interface between the Memory Expander 19 and the Controller 17 includes the following:
1. Reset line 32.
2. Read line 34.
3. Write line 36.
4. Reset Address Register line 38.
5. Sector Number lines 40.
6. Sector Strobe line 42.
7. Increment Sector Number line 44.
8. Subtract Sector Size line 46.
9. Complete line 47.

The Controller 17 contains the necessary elements, known to those skilled in the art, to effect direct memory access data transfers between the two memory units, SMM 15 and PMM 13. The Controller thus includes a memory address register, a sector number register, a data formatter, and control logic (all not shown). In this invention, an entire block of $2^j$ words is addressed by a single sector number which is stored in the Controller's sector number register. This block of $2^j$ words is referred to as a sector of data. The term "$j$" is more completely defined hereinafter.

The Memory Expander/Controller Reset line 32 allows the Memory Expander 19 to stop any transfer of data that may be taking place between the Controller 17 and the PMM 13. The Reset signal has no effect on the contents of the Controller's memory address or sector number registers (not shown). The Read line 34 allows the Memory Expander 19 to initiate a transfer of SMM 15 data, beginning at the address specified by the Controller's sector number register, to the PMM 13 beginning at the address specified by the Controller's memory address register. The Write line 36 allows the Memory Expander 19 to initiate a transfer of PMM 13 data, beginning at the address specified by the Controller's memory address register, to the SMM 15 beginning at the address specified by the Controller's sector number register. The Reset Address Register line 38 allows the Memory Expander 19 to set the Controller's memory address register to zero. The Sector Number lines 40, together with the Sector Strobe line 42, allow the Memory Expander 19 to store a sector number in the Controller's sector number register. The Increment Sector Number line 44 allows the Memory Expander 19 to increment by one the sector number contained in the Controller's sector number register. The Subtract Sector Size line 46 allows the Memory Expander 19 to command the Controller to subtract the number of words contained in one sector from the contents of the Controller's memory address register. The Complete line 47 allows the Controller to notify the Memory Expander 19 when it has completed the transfer of each sector of data.

The interface between the SMM 15 and the Controller 17 consists of a set of data lines 48, sector number lines 49, and an enable line 50.

II. MAIN MEMORY OPERATION

When the CPU 11 requires a word from Main Memory 10, it places the address of the required word on Memory Address lines 12, sends a Read signal on Read/Write line 20, and generates a memory access request on the Memory Access Request line 14. The CPU 11 then suspends any further operation until it receives a Ready signal back over line 18 from the PMM 13.

The Memory Expander 19 determines whether or not the requested word is present in PMM 13, as explained hereinafter. If it is, the Memory Expander 19 sends a calculated address over Memory Address lines 24 to the PMM 13 and then generates an enable signal to the PMM 13 on Enable line 22. When the PMM 13 is enabled and places the required word on Data lines 16 to the CPU 11, it generates a signal on ready line 18, thus initiating the transfer of data.

If the requested word is not present in the PMM 13, the Memory Expander 19 causes the Controller 17 to refill all or a part of the PMM's 13 memory from SMM 15 beginning at the sector in which the requested word resides, as will be described hereinafter. As soon as the first sector has been transferred over Data lines 48 and 26, the Memory Expander 19 sends the proper address via Memory Address lines 24 to the PMM 13, and then sends an enable signal over line 22. As soon as the PMM 13 accesses the requested word and places it on Data lines 16 to the CPU 11 through its internal logic, it generates a signal on Ready line 18 to the CPU 11 which then continues operation.

The manner in which the Memory Expander 19 causes the Controller 17 to refill the PMM 13 when the requested word is not present in the PMM 13 is as follows:

1. The Memory Expander 19 sends a signal via Reset line 32 to the Controller 17 to stop any transfer currently in progress.

2. The Memory Expander 19 sends a Reset Address Register signal over line 38 to set the Controller's 17 memory address register to zero.

3. The Memory Expander 19 places the Sector Number in which the requested word resides on lines 40 and then generates a Sector Strobe signal on line 42 to transfer the sector number into the Controller's sector number register.

4. The Memory Expander 19 then sends a Read signal on line 34 to the Controller 17. The Controller will then read the specified sector from SMM 15 and transfer it to PMM 13 via Data lines 26 and 48. After each word is transferred to the PMM 13, the Controller 17 increments its memory address register to the next location in the PMM 13. When all words in the sector have been transferred, a Complete signal is sent over line 47 to the Memory Expander 19. The Memory Expander 19 then determines if more sectors are to be transferred, and if so, generates an Increment Sector Number signal on line 44 and another Read signal on line 34. This process continues until all of the required sectors have been transferred.

The CPU 11 can continue to function and access Main Memory 10 while the Controller 17 continues to fill the PMM 13. Each CPU memory access request will be granted with no delay to the operation of the CPU 11 as long as the word requested already resides in PMM 13 within a sector which has been completely transferred by the Controller 17. Each time the CPU 11 requests a word from Main Memory 10 that is not in PMM 13, the Memory Expander 19 initiates a complete refill of PMM 13 from SMM 15 with as many sectors as PMM 13 will hold, beginning with the sector in which the requested word resides.

In one embodiment of the invention, the Memory Expander 19 will not initiate a new memory refill if the CPU 11 requests a word not presently in the PMM 13 and the following conditions are satisfied:

1. The Controller 17 is presently in the process of refilling the PMM 13;

2. The word requested is contained within one of the sectors that will be loaded into the PMM 13 by the Controller 17 in the present refill operation; and 3. The number of sectors remaining to be loaded in the present refill operation before loading the sector in which the requested word is contained is less than a predetermined number of sectors.

Once the refill operation is complete, the Memory Expander 19 performs a "centering" operation of the PMM 13. Upon each memory access by the CPU 11, Memory Expander 19 checks to determine if the requested word is contained within a sector which is less than "$k_1$" sectors from the last sector in PMM 13 or less than "$k_2$" sectors from the beginning sector in PMM 13, where $k_1$ and $k_2$ are predetermined numbers of sectors. If either condition is true, then the Memory Expander 19 will cause the Controller 17 to transfer new sectors to and delete old sectors from the PMM 13 in order to maintain each sector currently being accessed by the CPU 11 in the "center" of the PMM 13; that is, farther from the last sector than $k_1$ sectors and farther from the beginning sector than $k_2$ sectors. This process is defined as "centering."

The above description of operations within the Main Memory 10 is completely implemented in hardware and requires no unique instructions or actions from the CPU 11.

III. DETAILED DESCRIPTION OF THE PREFERRED EMBODIMENTS

Figure 2A:
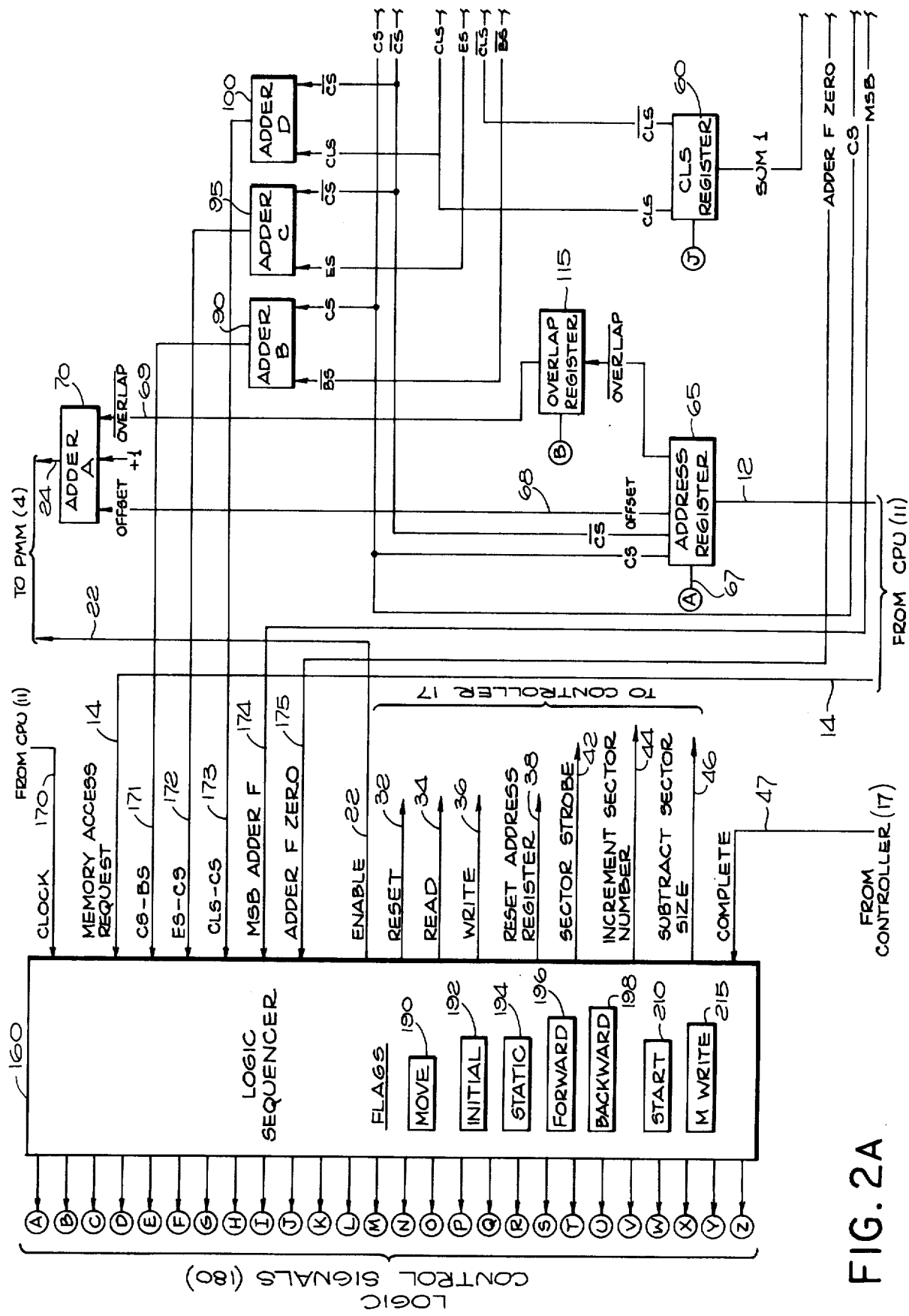
FIGS. 2 (a) and 2 (b) are block and logic diagrams of the Memory Expander of FIG. 1 and showing the control signals to and from the various elements of the Memory Expander.
Figure 2B:
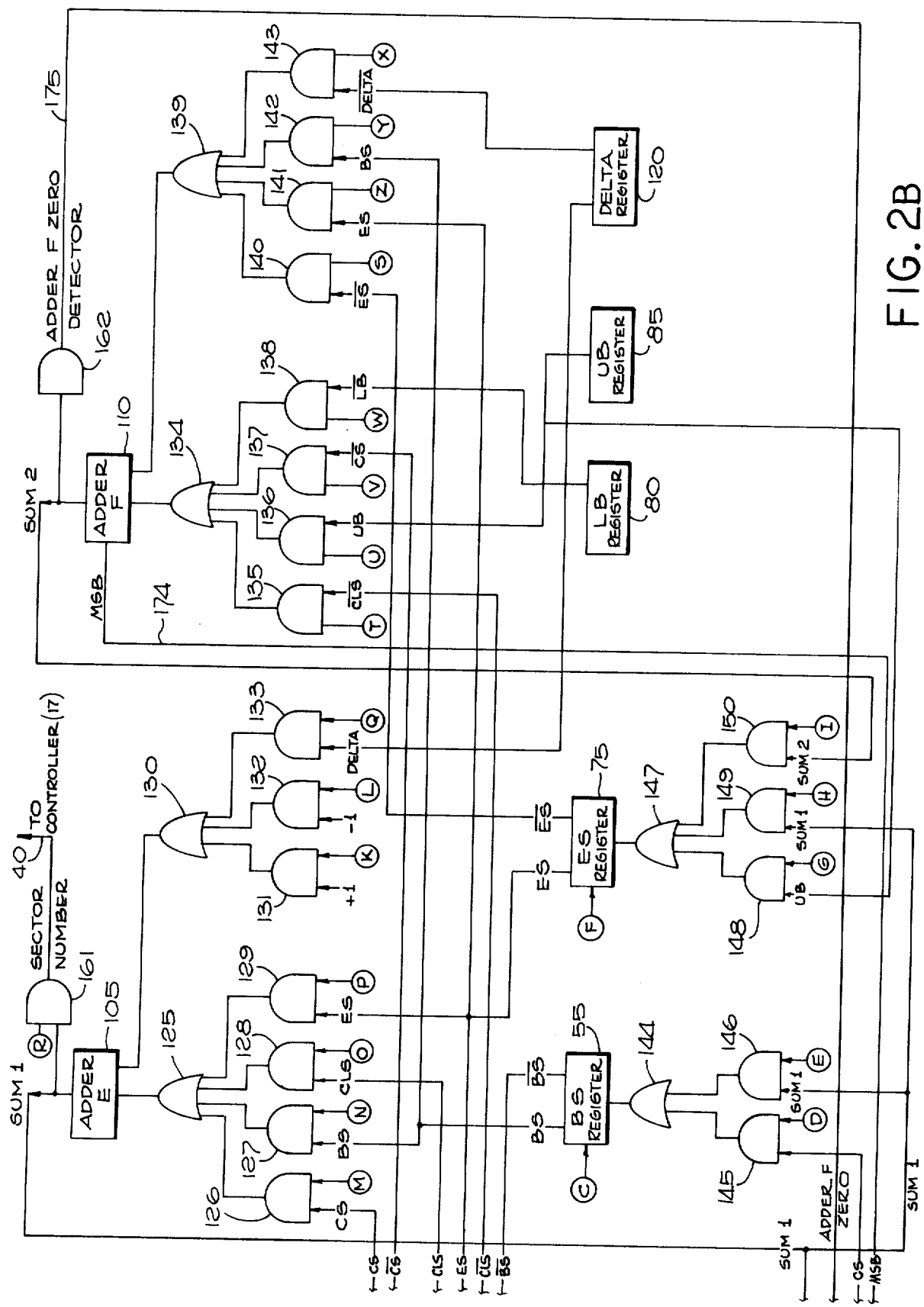

FIG. 2 is a detailed block and logic diagram of the Memory Expander 19. For convenient reference, the following glossary of signals specifically identified in FIG. 2 is provided, indicating the abbreviation used herein, the signal name, and the source of the signal:

| Signal Abbreviation | Signal Name | Source of Signal |
|---|---|---|
| BS | Beginning Sector | BS Register 55 |
| CLS | Current Last Sector | CLS Register 60 |
| CS | Current Sector | Address Register 65 |
| EA | Effective Address | Adder A 70 |
| ES | Ending Sector | ES Register 75 |
| LB | Lower Bound | LB Register 80 |
| UB | Upper Bound | UB Register 85 |

The Memory Expander 19 includes the following elements:

1. Six Adders: A 70, B 90, C 95, D 100, E 105 and F 110.
2. Eight Registers: BS 55, CLS 60, Address 65, ES 75, LB 80, UB 85, Overlap 115 and Delta 120.
3. Gating circuitry 125 through 143, 161 and 162 associated with Adders E 105 and F 110.
4. Gating circuitry 144 through 150 associated with BS Register 55 and ES Register 75.
5. A Logic Sequencer 160.

A. DESCRIPTION OF MEMORY EXPANDER ELEMENTS

The input to the Address Register 65 consists of the memory address vector X on Memory Address lines 12 from the CPU 11. Logic Control Signal A is used to strobe the Memory Address into register 65. As has been previously stated, vector X is an $(n+1)$ digit, zero origin, leftward indexing vector where $X = x_n \ldots x_k \ldots x_j \ldots x_o$, where $n > k > 0$ and $(k+1) \geq j \geq 0$. (The symbol $\geq$ means "greater than or equal to"). Vector X is divided into three fields which are used elsewhere in the Memory Expander 19. These three fields are defined as follows:

Current Sector (CS) = $x_n \ldots x_j = n-j+1$ bits.

Overlap = $x_k \ldots x_j = k-j+1$ bits.

Offset = $x_k \ldots x_o = k+1$ bits.

The total number of sectors directly addressable in Secondary Main Memory 15 is equal to at least $2^{(n-j+1)}$ sectors where, as in this embodiment which uses a binary system, the number of possible combinations is equal to two raised to the power of the number of binary bits available to describe the particular sector location.

The number of sectors contained within Primary Main Memory 13 is equal to $2^{(k-j+1)}$. The number of data words contained within each sector is $2^j$.

Another way of describing the address vector is that within address vector X, the most significant $n-j+1$ bits are used to define the sector number of the data word of interest. This sector number is referred to as the Current Sector (CS). The Offset and overlays are used to describe the word location of the desired data word contained within Primary Main Memory 13.

The directly addressable address space as seen from CPU 11 is, therefore, the total number of sectors $2^{n-j+1}$ times the number of data words per sector $2^j$ which equals $2^{n+1}$ data words.

Some of the registers deliver data in both the true and complement form. The complement form employed here is the one's complement form which means that the sense of every binary digit is changed. Thus, in the one's complement format, every zero and one in the true form becomes one and zero, respectively, in the complement form. The notation for the complement form of a variable is the variable with an overbar. For example, $\overline{CS}$ is the complement of CS. All the adders are two's complement adders, a technique well known in the digital processing art.

Adder A 70 is used exclusively to compute the Effective Address (EA) which the Memory Expander 19 sends to the PMM 13 via Memory Address lines 24. The Effective Address in Adder A 70 equals the Offset 68 from Address Register 65 plus the value of Bias which is derived from a combination of a plus one carry and overlap 69 from Overlap Register 115, as will be explained hereinafter. Thus, the internal value Bias in Adder A 70 is equal to the two's complement of the quantity "Overlap multiplied by $2^j$".

Adder B 90 is used exclusively to compute the difference between BS and CS. ES is set equal to BS + Delta where Delta is equal to one less than the number of sectors which can be held by PMM 13. The number Delta is stored in Delta Register 120.

Adder C 95 is used exclusively to compute the difference between ES and CS.

Adder D 100 is used exclusively to compute the difference between CLS and CS. CLS is the highest numbered sector that has been completely loaded into the PMM 13.

Adder E 105 is used to add any one of the four values CS, BS, CLS, or ES to any one of the three values of $+1$, $-1$, or Delta. The actual values entered into Adder E 105 are determined by Logic Control Signals K through Q, inclusive, as they are generated by Logic Sequencer 160. For example, whenever Logic Control Signal M is present at AND Gate 126, signal CS is allowed to pass through OR Gate 125 to appear at the input to Adder E 105. Likewise, the absence of Logic Control Signals N, O, and P at Gates 127, 128, and 129 prevent signals BS, CLS, and ES from appearing at the input to Adder E 105. The output at Gates 131, 132 and 133 pass through OR Gates 130 to Adder 105. The output of Adder E 105 is labeled "SUM 1" and is used as an input to registers CLS 60, BS 55, and ES 75. Adder E 105 is also used to route the Sector Number to the Controller 17 via AND Gate 161 and Sector Number lines 40. Operation of AND Gate 161 is controlled by Logic Control Signal R. When the output of Adder E 105 corresponds to the Sector Number of interest, the Logic Sequencer generates Logic Control Signal R which opens gate 161, thus allowing the Sector Number to appear on Sector Number lines 40 which connect with Controller 17.

Adder F 110 is used to add any one of the four values $\overline{CLS}$, UB, $\overline{CS}$, or $\overline{LB}$ to any one of the four Values Delta, BS, ES, or ES. The actual values entered into Adder F 110 are determined by Logic Control Signals "S" through "Z," inclusive, as they are generated by Logic Sequencer 160, and pass through OR Gates 134 or 139 to Adder F. The output of Adder F 110 is labeled "SUM 2" and is used an an input to Register ES 75. A Zero Detector Gate 162, which indicates a zero output of Adder F 110, is connected to Logic Sequencer 160. In addition, Adder F 110 places on line 174 the most significant bit (MSB) of its output word which, in a two's complement adder, is equivalent to the sign bit.

Register Delta 120 is used to retain the value of Delta, which equals the number of sectors in PMM 13 minus 1. Register UB 85 is used to retain the highest sector number that can be accessed by the CPU 11. Register LB 80 is used to retain the lowest sector number that can be accessed by the CPU 11. Both the values and the permanency of the values contained in Registers LB 80, UB 85, and Delta 120 can be varied depending upon the specific implementation chosen. Any or all of these three values could be permanently established at the time the Memory Expander 19 is constructed and would therefore remain fixed in value or these values could be established by switch positions that could be set manually and then changed whenever desired. Finally, any or all of these three values could be established by utilizing programmable registers that could be controlled by a software program in the CPU 11.

CLS Register 60 is used to retain the value of CLS. It receives its input SUM 1 from the output of Adder E 105 which is strobed in by Logic Control Signal J.

Overlap Register 115 is used to retain the value of Overlap. The input to Overlap Register 115 is strobed in by Logic Control Signal B.

BS Register 55 is used to retain the value of BS. It receives inputs CS and SUM 1 which are gated in by Logic Control Signals D and E, respectively. CS and SUM 1 are strobed into BS Register 55 through OR Gate 144 by Logic Control Signal C.

ES Register 75 is used to retain the value of ES. It receives inputs UB, SUM 1 and SUM 2 from UB Register 85, Adder E 105, and Adder F 110, respectively. The inputs are gated into ES Register 75 by Logic Control Signals G, H, and I through OR gate 147 and are strobed into the Register by Logic Control Signal F.

Referring to FIG. 2 (a), the Logic Sequencer 160 controls the operation of the Memory Expander 19, PMM 13, SMM 15 and Controller 17 by monitoring the following inputs and generating the following outputs:

| INPUTS | |
|---|---|
| SIGNAL | SOURCE |
| 1. Clock 170 | CPU 11 |
| 2. Memory Access Request 14 | CPU 11 |
| 3. CS-BS 171 | Adder B 90 |
| 4. ES-CS 172 | Adder C 95 |
| 5. CLS-CS 173 | Adder D 100 |
| 6. MSB Adder F 174 | Adder F 110 |
| 7. Adder F Zero 175 | Zero Detector 162 |
| 8. Complete 47 | Controller 17 |

| OUTPUTS | |
|---|---|
| SIGNAL | DESTINATION |
| 1. Logic Control Signals A-Z 180 | Logic elements contained within Memory Expander 19 |
| 2. Enable 22 | PMM 13 |
| 3. Reset 32 | Controller 17 |
| 4. Read 34 | Controller 17 |
| 5. Write 36 | Controller 17 |
| 6. Reset Address Register 38 | Controller 17 |
| 7. Sector Strobe 42 | Controller 17 |
| 8. Increment Sector Number 44 | Controller 17 |
| 9. Subtract Sector Size 46 | Controller 17 |

The Logic Sequencer 160 incorporates conventional logic circuitry to generate Logic Control Signals 180 in accordance with the sequence to be described. In order to accomplish this, Logic Sequencer 160 incorporates seven flags, that is, seven digital flip-flop circuits whose states correspond to either zero or one. The use of such circuits to control logic sequencing is well known in the digital processing art. The flags, or flip-flops, and their usage are as follows:

| FLAG | USE |
|---|---|
| 1. Move 190 | When this Flag is in the one state, it prevents the initiation of a forward/backward centering operation whenever a backward/forward centering operation is in the process of moving a sector of data. |
| 2. Initial 192 | A new refill operation is started whenever this Flag is set to one |
| 3. Static 194 | Whenever this Flag is set to one, a refill operation has been successfully completed and "centering" is being enabled. Static 194 serves as an enabling signal for Forward Flag 196 and Backward Flag 198. That is, when Static 194 is one, Flags 196 and 198 are allowed to be set to one, and when Static 194 is zero, 196 and 198 are prevented from being set to one |
| 4. Forward 196 | This Flag is set to one when a forward centering operation is required and will be initiated. |
| 5. Backward 198 | This Flag is set to one when a backward centering operation is required and will be initiated. |
| 6. Start 210 | This Flag is used for RWM operations. If this Flag is set to zero, it prevents writing sectors from PMM 13 into SMM 15. |
| 7. MWrite 215 | This Flag is also used for RWM operations. If this Flag is set to one, it indicates that a centering operation is in progress. |

With respect to the CPU 11, Main Memory 10 can be configured either as a Read Only Memory (ROM) or a Read/Write Memory (RWM). In the ROM embodiment, CPU 11 can only request a Read access from Main Memory 10. This only applies to the CPU 11-Memory interface since the Memory Expander 19 must still execute Write operations from SMM 15 to PMM 13 in order to maintain the data in PMM 13 which is required by CPU 11 in Read operations. The operation of the ROM embodiment will be described first and then the differences in the RWM embodiment will be explained.

B. DESCRIPTION OF ROM EMBODIMENT

Power-On Timing Sequence

Whenever power is applied to Main Memory 10, Logic Sequencer 160 initializes Memory Expander 19 by:

1. Setting ES Register 75 to zero by Logic Control Signal F;
2. Setting BS Register 55 to one by entering the value of +1 into Adder E 105 with Logic Control Signal K applied to Gate 131, and then placing the +1 output of Adder E 105 (SUM 1) in BS Register 55 through Gates 146 and 144 by Logic Control Signals E and C;
3. Setting Initial Flag 192 and Static Flag 194 to zero; and,
4. Simultaneously, with the above, sending Reset Signal 32 to the Controller 17.

MEMORY ACCESS REQUEST SEQUENCE

When CPU 11 generates a Memory Access Request via line 14, Logic Sequencer 160 strobes the information contained on Memory Address lines 12 into Address Register 65 by generating Logic Control Signal A. At this point, the outputs of Adders B 90, C 95, and D 100 will contain information regarding the respective values of the differences between CS and BS, ES and CS, and CLS and CS. Logic Sequencer 160, through standard circuitry, then determines whether BS≦CS≦ES (where ≦ means "less than or equal to") and CS≦CLS by inspection of the most significant bits of each of the outputs of Adders B 90, C 95, and D 100. If BS≦CS≦ES, then the word requested in either presently in PMM 13 or will be in PMM 13 during the present refill operation. If CS≦CLS, then the word requested by CPU 11 is presently in PMM 13 and can be immediately accessed, in which case Logic Sequencer 160 generates Enable signal 22 to PMM 13. If CS is greater than CLS, then the current last section (CLS) has not been entered into PMM 13 and the Logic Sequencer 160 will test to determine if CS is more than a predetermined number of sectors ($k_3$) greater than CLS. If CS is within $k_3$ sectors of CLS, then Logic Controller 160 will wait until the required sector is entered into PMM 13 and will then generate Enable signal 22 to PMM 13. If CS - CLS is greater than $k_3$ sectors, or if CS is less than BS or greater than ES, a new refill operation will initiate.

If a new refill operation is to be initiated, Logic Sequencer 160 first sets flags 190, 192, 194, 196, and 198 to zero. Logic Sequencer 160 then determines if CS + Delta is greater than UB, the highest sector number that can be accessed by CPU 11. As previously explained, Delta is set to equal the number of sectors in PMM 13 minus one. If CS is equal to or less than UB - Delta, then ES is set to CS + Delta. If CS is greater than UB − Delta, then ES is set to UB. This is accomplished as follows:

1. The quantity of UB − Delta is formed in Adder F 110 when Logic Sequencer 160 places Logic Control Signals U and X at the inputs of Gates 136 and 143, respectively.

2. The output SUM 2 of Adder F 110 (i.e., UB − Delta) is placed in ES Register 75 by Logic Control Signal I, which opens Gate 150 and Logic Control Signal F.

3. The quantity ES − CS is next formed in Adder F 110 when Logic Sequencer 160 places Logic Control Signals Z and V at the inputs of Gates 141 and 137, respectively.

4. Logic Sequencer 160 then determines if CS≦(UB − Delta) by inspecting MSB Adder F on line 174. If ES is greater than CS, then MSB Adder F will be positive and ES will be set to equal CS + Delta by Logic Sequencer 160 generating Logic Control Signals M, Q, H, and F. If MSB Adder F is negative, then ES will be set to UB by Logic Sequencer 160 generating Logic Control Signals G and F.

Upon completion of the steps determining the value of ES, the Logic Sequencer 160 initiates the refill operation as follows:

1. A Reset Signal is sent over line 32 to Controller 17.

2. The value of BS Register 55 is set equal to CS by Logic Control Signals D and C generated by the Logic Sequencer 160.

3. The value of CLS Register 60 is set equal to "CS − 1" by Logic Control Signals M, L, and J generated by the Logic Sequencer 160.

4. BS is represented by the Vector B=$b_n$... $b_k$... $b_j$ ... $b_o$. Overlap is equal to the value of the vector $b_k$ .. $b_j$. The value of Overlap Register 115 is set equal to Overlap by the Logic Control Signal B generated by Logic Sequencer 160. The Effective Address (EA) is computed in Adder A 70 by adding together the values of Offset 68 and Bias. Bias is equal to the two's complement of the quantity "Overlap multiplied by $2^j$." Bias is obtained in Adder A 70 as follows:

a. Entering the value of $\overline{\text{Overlap}}$ 69 shifted left $j$ bits by direct wiring.

b. Entering "ones" into the least significant $j$ bits of Adder A 70 by wiring these inputs to a logical one.

c. Setting the carry-in of Adder A 70 equal to one.

5. Initial Flag 192 is set to one, thus allowing the refill operation to begin.

While the refill operation is in process, Logic Sequencer 160 continually monitors the output of Adder D 100 to determine whether CS≦CLS. When this condition is satisfied, then the first sector of the new refill operation has been completely transferred into PMM 13, and the word requested by CPU 11 can be accessed immediately. Logic Sequencer 160 then sends an Enable Signal via line 22 to PMM 13.

REFILL OPERATION SEQUENCE

When Initial Flag 192 is set to one, other circuitry in Logic Sequencer 160 generates a sequence of logic control signals which cause a refill operation from SMM 15 to PMM 13 to occur. The initial steps in this sequence are as follows:

1. The Memory Memory Address Register in the Controller 17 is set to zero by the Logic Sequencer 160 generating a Reset Address Register signal on line 38.

2. The value in BS Register 55 (CS) is sent to Controller 17 by generating Logic Control Signal N, which opens Gate 127, and Logic Control Signal R which open Sector Number Gate 161. When this occurs, the value of CS appears on Sector Number lines 40 to the Controller 17. A signal is then sent to Controller 17 on the sector strobe line 42 which strobes the sector number into the sector number register in Controller 17.

3. A READ Signal is then sent to the Controller 17 via line 34 which initiates a sector transfer from SMM 15 to PMM 13.

Upon completion of this initial sequence, Logic Sequencer 160 waits for the sector information to be transferred. When the transfer is completed, Controller 17 sends a Complete signal to Logic Sequencer 160 via line 47. The value of CLS Register 60 is incremented by one by the Logic Sequencer 160 placing Logic Control Signals O and K on Gates 128 and 131, respectively. Thus, CLS + 1 will appear at the output of Adder E 105 which, in turn, is placed at the output of CLS Register 60 by Logic Control Signal J. The Logic Sequencer 160 then calculates the value of ES minus CLS to determine if the refill operation has been completed. This is accomplished by entering the value of CLS and ES into Adder F 110 by applying Logic Control Signals T and Z to Gates 135, 141, respectively. The Logic Sequencer 160 monitors the output of Zero Detector 162 via line 175. If this output is not zero, then all of the sectors have not yet been transferred from SMM 15 to PMM 13 and Logic Sequencer 160 will increment the sector number in Controller 17 by generating an increment Sector Number Signal via line 44. The Logic Sequencer 160 will then send a Read signal on line 34 to the Controller 17 which will cause the transfer of the next sector of information from SMM 15 to PMM 13.

When the output of Zero Detector 162 equals zero, then CLS equals ES and all of the sectors in the current refill operation have been transferred. At this time, the Logic Sequencer 160 sets Initial Flag 192 to zero and Static Flag 194 to one, thus indicating that the refill operation has been terminated and that the centering operation has been enabled.

CENTERING FLAGS CONTROL SEQUENCE

When Static Flag 194 is set to one, other logic in the Logic Sequencer 160 is enabled to control the setting of Forward Flag 196 and Backward Flag 198. Forward Flag 196 is controlled by Logic Sequencer 160 input lines ES - CS 172 and the Backward Flag 190 is controlled by input lines CS - BS 171. During each memory access request by CPU 11, these inputs are inspected by Logic Sequencer 160 to determine whether ES − CS$\leq k_1$ or CS − BS$\leq k_2$, where $k_1$ and $k_2$ are predetermined numbers of sectors as explained above. If ES − CS$\leq k_1$, then Logic Sequencer 160 sets Forward Flag 196 to one. If CS − BS$\leq k_2$, then Logic Sequencer 160 sets Backward Flag 198 to one. The setting of Flags 196 or 198 to one enables other logic within the Logic Sequencer 160 to perform the centering operation.

CENTERING FORWARD SEQUENCE

When Forward Flag 196 is set to one, other logic circuitry within Logic Sequencer 160 is enabled to delete sectors from the beginning of PMM 13, starting with the lowest numbered sector, and to add sectors to the end of PMM 13 to keep each sector accessed by CPU 11 farther than "$k_1$" sectors below the highest numbered sector in PMM 13. This is accomplished by performing the following operations.

Upon Flag 196 being set to one, the Logic Sequencer 160 determines if Move Flag 190 has also been set to one to indicate that a backward centering operation is in the process of transferring a sector of data. If More Flag 190 has been set to one, the Logic Sequencer 160 will wait until the transfer is completed and Move Flag 190 has been reset to zero. When the Move Flag 190 is set to zero, the Logic Sequencer 160 continues with the forward centering operation by first setting Move Flag 190 to one to prevent a backward centering operation from starting while a sector is being transferred. Logic Sequencer 160 next determines whether new sectors can be added to the end of PMM 13 without exceeding the upper bound (UB) of Main Memory 10. This is accomplished by entering the value of UB and $\overline{ES}$ into Adder F 110 through generation of Logic Control Signals U and S which open Gates 136 and 140, respectively. The output of Adder F 110 represents UB - ES and is monitored by Logic Sequencer 160 via the output line 175 of Zero Detector 162.

If this output is zero, then UB equals ES and Logic Sequencer 160 sets Forward Flag 196 and Move Flag 190 to zero, thus terminating the forward centering operation. If ES is less than UB, then Logic Sequencer 160 causes one to be added to the values of both BS and ES. This is accomplished by entering the values of BS and +1 into Adder E 105 through generation of Logic Control Signals N and K and then placing the SUM 1 output of Adder E 105 into BS Register 55 by generation of Logic Control Signals E and C. Register ES 75 is similarly incremented by entering the values of ES and +1 into Adder E 105 by generation of Logic Control Signals P and K and then placing the SUM 1 output of Adder E 105 into ES Register 75 by generation of Logic Control Signals H and F.

Logic Sequencer 160 then sends the newly generated value of ES to the Controller 17 Sector Number Register via Sector Number lines 40 by generating Logic Control Signal P and R. The Logic Sequencer 160 then sends a Read signal on line 34 to the Controller 17 which initiates a sector transfer from SMM 15 to PMM 13. Complete line 47 from the Controller 17 is monitored by the logic sequencer to determine if the sector transfer has been completed. Upon receipt of a Complete Signal via 47, the Logic Sequencer increments the contents of CLS Register 60, in a similar manner as previously explained for incrementing ES Register 75, by generating Logic Control Signals O, K, and J.

Logic Sequencer 160 next samples the value of Forward Flag 196 to determine if additional forward centering is required as a result of the ES − CS$\leq k_1$, as explained above. If, as a result, Flag 196 is at one, Logic Sequencer 160 repeats the forward centering operation described above. If Flag 196 is not equal to one, then Logic Sequencer 160 sets More Flag 190 to zero, thus terminating the forward centering operation.

CENTERING BACKWARD SEQUENCE

When Backward Flag 198 is set to one, other logic within Logic Sequencer 160 is enabled to delete sectors from the end and add sectors at the beginning of PMM 13 to attempt to keep each sector accessed by CPU 11 farther than "$k_2$" sectors from the lowest numbered sector in PMM 13. This is accomplished by performing the following operations.

When Flag 198 is set to one, Logic Sequencer 160 determines whether Move Flag 190 has also been set to one to indicate that a forward centering operation is in the process of transferring a sector of data. If this is true, then Logic Sequencer 160 will wait until the transfer is completed and Move Flag 190 is reset to zero. When Move Flag 190 is set to zero, the Logic Sequencer 160 continues with the backward centering operation by first setting Move Flag 190 to one, thereby preventing a forward centering operation from starting while a sector is being transferred.

Logic Sequencer 160 next determines whether lower numbered sectors can be added at the beginning of PMM 13 without going below the lower bound (LB) of Main Memory 10. This is accomplished by entering the values of BS and $\overline{LB}$ into Adder F 110 by Logic Control Signals Y and W. The output of Adder F Zero Detector 162 is monitored on line 175. If this output is zero, then BS equals LB and Logic Control Sequencer 160 sets Backward Flag 198 and Move Flag 190 to zero, thus terminating the backward centering operation. If the output at Zero Detector 162 is not zero, then the Control Sequencer 160 continues with the backward centering operation as follows.

The Control Sequencer 160 first subtracts one from the values in CLS Register 60 and ES Register 75. This is accomplished by first entering the values CLS and −1 into Adder E 105 by applying Logic Control Signals O and L to Gates 128 and 132, respectively. The SUM 1 output of Adder E 105 is then strobed into CLS Register 60 by Logic Control Signal J. Next, the values ES and −1 are entered into Adder E 105 by applying Logic Control Signals P and L to Gates 129 and 132, respectively. The SUM 1 output of Adder E 105 is then placed in Register ES by applying Logic Control Signals H and F.

Logic Sequencer 160 next sets the Sector Number Register in Controller 17 to BS −1 by applying Logic Control Signals N and L to Gates 127 and 132, respectively, and then generating Logic Control Signal R to transfer the resultant output of Adder E 105 through Sector Number Gate 161 to Sector Number lines 40. This value is strobed into the Sector Number Register by a signal on the Sector Stobe line 42. In conjunction with this operation, the Logic Sequencer sends a Subtract Sector Size Signal on line 46 which commands the Controller 17 to subtract the number of words contained in a sector from the contents of its Memory Address Register. The Logic Sequencer 160 then sends a Read Signal to the Controller 17 via line 34, thus initiating a sector transfer from SMM 15 to PMM 13.

When the transfer is completed, Controller 17 sends a Complete signal via line 47 to the Logic Sequencer 160 which then subtracts one from the value of BS and subtracts the sector size from the address in the Controller 17 Memory Address Register. This is accomplished by entering the values of BS and −1 into Adder E 105 by applying Logic Control Signals N and L to Gates 127 and 132, respectively, and then transferring the output of Adder E 105 to BS Register 55 with Logic Control Signals E and C. Logic Sequencer 160 then subtracts sector size from the Controller 17 Memory Address Register by applying a Subtract Sector Size signal to line 46.

Logic Sequencer 160 next samples the value of Backward Flag 198 to determine if additional backward centering is required as a result of the CS $-BS \leq k_2$, as explained above. If Flag 198 is set to one, the Logic Sequencer 160 repeats the backward centering operation described above. If the output of Flag 198 is not equal to one, then the Logic Sequencer 160 sets Move Flag 190 to Zero, thus terminating the backward centering operation.

C. DESCRIPTION OF RWM EMBODIMENT

In the ROM embodiment, the CPU 11 does not change any of the data words in PMM 13. Therefore, the sectors in PMM 13 are always identical to their corresponding sectors in SMM 15 and need never be written back into SMM 15 after they have been used. In the RWM embodiment, the CPU 11 is allowed to enter new data words into sectors stored in PMM 13. It is, thus, necessary to write back into SMM 15 all sectors whose data content have been changed in PMM 13. The additional logic within the Logic Sequencer 160 which is necessary to generate the control signals to accomplish this result is the only difference between the ROM and RWM embodiments. This additional logic is explained below.

POWER ON TIMING SEQUENCE

The Power-on sequence is identical to that for the ROM embodiment, except that two additional flags internal to the Logic Sequencer 160 are initialized by setting them to zero. These two flags are Start 210 and MWrite 215, which are used by the Logic Sequencer for writing sectors in PMM 13 and back into SMM 15.

MEMORY ACCESS REQUEST SEQUENCE

The operations performed for each memory access request are identical to those described for the ROM embodiment up to the point where a new refill operation is initiated. Prior to such initiation, the following operations must take place in the RWM embodiment so that the sectors which have been written into PMM 13 by the CPU 11 can be written back into SMM 15.

After power has been applied and the first memory request by CPU 11, a refill operation will be initiated. The value of Start Flag 210 will be zero at this time. Start Flag 210 retains the value of zero from the power-on timing sequence until after the first refill operation, at which time it is set to one and remains at that value. This flag is used to prevent the writing of erroneous data to SMM 15 before the first refill operation takes place by causing the Logic Sequencer 160 to bypass writing the sectors in PMM 13 back into SMM 15 and continue with the refill operation as described for the ROM embodiment. This bypass operation only occurs once.

When the first refill is completed, the value of Start Flag 210 is set equal to one and the Logic Sequencer will then test the value of MWrite Flag 215. If its value is equal to one, the Logic Sequencer 160 will wait until it changes to zero before proceeding. The value of MWrite 215 is controlled by the centering logic within Logic Sequencer 160 and is set to one whenever a sector is being written into SMM 15 from PMM 13 during a centering operation. The purpose of MWrite Flag 215 is to synchronize the writing of PMM 13 sectors back into SMM 15 during the refill operation with the writing of sectors from PMM 13 into SMM 15 during forward and backward centering operations.

When the value of MWrite is zero, Forward Flag 196 and Backward Flag 198 are set to zero and a Reset Signal is sent to Controller 17 via line 32. Logic Sequencer 160 then sends the value of BS Register 55 to Controller 17 by generating Logic Control Signal N, which opens gate 127 and places BS at the output of Adder E 105, and Logic Control Signal R which opens Sector Number Gate 161, thus placing BS on Sector Number lines 40. This value is strobed into the Controller 17 Sector Number Register by a signal on the Sector Strobe line 42. The Logic Sequencer 160 next sends a Write signal on line 36 to Controller 17 to initiate the sector transfer from PMM 13.

The Logic Sequencer 160 then monitors Complete line 47 from Controller 17 to determine when the sector transfer has been completed. When the Complete signal is received, Logic Sequencer 160 calculates the value of BS − CLS to determine whether all of the required sectors in PMM 13 have been transferred to $\overline{\text{SMM 15}}$. This is accomplished by entering the values of $\overline{\text{CLS}}$ and BS into Adder F 110 by initialing Logic Control Signals T and Y, and then testing the output of Zero Detector 162 on line 175 for a zero condition. If all of the sectors have not been transferred, the output of Zero Detector 162 will not be zero, and Logic Sequencer 160 will add one to the value of BS Register 55 and repeat the sector transfer process beginning with the transfer of the contents of BS Register 55 to Controller 17, as previously explained. The value of BS is increased by one by entering the value of BS and +1 into Adder E 105 with Logic Control Signals N and K, and then putting the SUM 1 output of Adder E 105 into BS Register 55 with Logic Control Signals E and C. When all of the sectors have been transferred, BS will equal CLS and the output of Zero Detector 162 will be zero. At this time, the Logic Sequencer 160 will continue with the refill operation.

REFILL OPERATION SEQUENCE

The operations required for the refill operation are identical with those required for the ROM embodiment.

CENTERING FLAGS CONTROL SEQUENCE

The operations required to control setting Forward Flag 196 and Backward Flag 198 are identical with those required for the ROM embodiment.

CENTERING FORWARD SEQUENCE

The operations required for the Centering Forward Sequence are identical to those of the ROM embodiment up to the point where it is determined that ES is less than UB. At that point, and before deleting a sector from the beginning of PMM 13, Logic Sequencer 160 must first write that sector back into SMM 15. This is accomplished by sending the value of BS to the Controller 17 Sector Number Register via lines 40 by generating Logic Control Signal N, which opens Gate 127, and Logic Control Signal R, which places the contents of Sector Number Gate 161 on line 40, and then strobing this value into the Controller 17 Sector Number Register by generating a signal on Sector Strobe line 42. The Logic Sequencer 160 next sets the value of the MWrite Flag 215 to one to indicate that a centering operation is in process and sends a Write Signal via line 36 to the Controller 17 to initiate a sector transfer. The Logic Sequencer 160 monitors Complete line 47 from Controller 17 and waits until a Complete signal is present indicating that the sector transfer to SMM 15 has been completed.

At this time, both BS and ES are incremented by one in the same manner as described in the ROM embodiment. The MWrite Flag 215 is then momentarily set to zero and then back to one by Logic Sequencer 160 to allow any pending refill operation to occur without having to wait for an unnecessary sector transfer from SMM 15 to PMM 13.

Because of the sector transfer operation described above, the sector size must be subtracted from the value of the Controller 17 Memory Address Register in order for the register to point to the proper PMM 13 location for subsequent operations. The Logic Sequencer 160 accomplishes this by sending the Subtract Sector Size signal on line 46. At this point, ES is sent to Controller 17, the sector transfer from SMM 15 to PMM 13 is accomplished, and CLS is incremented by one in the same manner as described for the ROM embodiment. After CLS is incremented by one, the MWrite Flag 215 is set to zero to again allow any pending refill operation to occur. If there is no pending refill operation, Logic Sequencer 160 samples Forward Flag 196 and continues in the same manner as detailed in the ROM embodiment.

CENTERING BACKWARD SEQUENCE

The operations required for the Centering Backward Sequence are identical to those of the ROM embodiment up to the point where it is determined that BS is greater than LB. At that point and before deleting a sector from the end of PMM 13, Logic Sequencer 160 must first write that sector back into SMM 15. This is accomplished by setting the MWrite Flag 215 to one to indicate that a centering operation is in process and then sending the value of ES to the Controlling 17 sector number register by generating Control Signal R to Sector Number Gate 161, thus allowing ES to appear on Sector Number lines 40. The Logic Sequencer then generates a signal on the Sector Strobe line 42 to strobe the Sector Number into the Sector Number Register in the Controller 17. The Logic Sequencer 160 next sends Subtract Sector Size signal on line 46 and a Write signal on line 36 to Controller 17. This initiates the sector transfer from PMM 13 to SMM 15. Logic Sequencer 160 then monitors Complete line 47 from Controller 17 to determine when the sector transfer from PMM 13 to SMM 15 has been completed.

At this point, both the CLS and ES Registers 60 and 75, respectively, are reduced by one in the same manner as described for the ROM embodiment. The MWrite Flag 215 is then momentarily set to zero and then back to one by the Logic Sequencer 160 in order to allow any pending refill operation to occur without having to wait for an unnecessary sector transfer from SMM 15 to PMM 13.

The Logic Sequencer 60 then sends BS − 1, Sector Strobe 42, Substract Sector Size 46, and Read 35 signals to Controller 17 in the same manner as described for the ROM embodiment. When Complete signal 47 is received from Controller 17, BS Register 55 is reduced by 1 and a Subtract Sector Size signal is sent via line 46 to the Controller 17 as in the ROM embodiment. The MWrite Flag 215 is then set to zero to again allow any pending refill operation to occur. If there is no pending refill operation, Logic Sequencer 160 samples Backward Flag 198 and continues in the same manner as detailed in the ROM embodiment.

Although detailed embodiments of the invention have been disclosed herein, various other sequencing techniques and apparatus may be utilized in employing this invention, all within the scope of the claims. Consequently, the specific details disclosed herein describe the best presently known embodiment for purposes of disclosure and provide a basis for the claims herein which define the scope of the invention.

What is claimed is:

1. A memory utilization apparatus for transferring data sectors between a first data storage device directly accessable to a processing unit of a computing device and a second data storage device accessable to the said processing unit through the first data storage device, comprising:
    a first data storage device from which data contained within a data sector is directly accessable by said processing unit;
    a second data storage device be transferred to the first data storage device for access by said processing unit;
    control means for receiving a request from said processing unit for data and for transferring the data sector containing the requested data from the second data storage device to the first data storage device, said control means further comprising means for automatically transferring a first sequence of data from the second data storage device to the first data storage device, in the same order in which the data appears in the second data storage device, said first sequence beginning with the data sector containing the requested data and ending with a data sector having an address determined so that said sequence of data will be contained in the first data storage device, the address of said beginning data sector and the address of said ending data sector forming a first set of limits;
    means for storing said first set of limits;
    means for monitoring the process of the data transfer by continuously updating and storing the address of the last data sector transferred to the first data storage device from the second data storage device throughout the transfer of the first sequence of data;

means for providing the processing unit with access to requested data within the first data storage device as soon as the data sector containing the requested data is transferred to the first data storage device;

means for determining whether a data sector containing further requested data by the said processing unit resides within the first data storage device at the time the request is made;

means for providing said processing unit with access to the first data storage device if the data sector containing the further requested data resides within the first data storage device;

means for determining whether the further requested data is within said first set of limits and within a predetermined number of data sector addresses beyond the address of the last data sector transferred in the transfer operation;

means for accessing the further requested data by said processing unit after the data sector containing the further requested data is transferred to the first data storage device if the data sector containing the further requested data is within said first set of limits and within said predetermined number of data sector addresses beyond the address of the last data sector transferred in the transfer operation;

means for refilling the first data storage device with a second sequence of data from the second data storage device if the further requested data is not contained within said first set of limits and said predetermined number of data sector addresses beyond the address of the last data sector transferred in the transfer operation, said second sequence beginning with the data sector containing the further requested data, said second sequence being transferred in the same order in which the data appears in the second data storage device, said second sequence of data ending with a data sector having an address determined so that said second sequence of data will be contained in the first data storage device, said refill beginning data sector address and said refill ending data sector address forming a second set of limits;

means for storing said second set of limits; and, means for monitoring the progress of the data transfer by continuously updating and storing the address of the last data sector transferred to the first data storage device throughout the transfer of the second sequence of data.

2. An apparatus as defined in claim 1 wherein a data sector comprises one data word.

3. An apparatus as defined in claim 1 wherein said refilling means further comprises said refilling starting regardless of whether transfer of said first data sequence has been completed.

4. An apparatus as defined in claim 3, further comprising:

means for continually adjusting said first set of limits in the first data storage device to maintain the data sector containing the currently requested data in a predetermined position relative to other data sectors in the first data storage device.

5. An apparatus as defined in claim 4 wherein said means for continually adjusting is adapted to maintain the data sector containing the requested data centered relative to other data sectors in the first data storage device.

6. An apparatus as defined in claim 4 wherein said control and refilling means further comprise means for transferring data sectors between the second data storage device and the first data storage device until a predetermined number of data sectors preceding the data sector containing the currently requested data and a predetermined number of data sectors following the data sector containing the currently requested data is stored in the first data storage device, all such data sectors being stored in the first data storage device in the same relative position to the data sector containing the currently requested data as in the second data storage device.

7. An apparatus as defined in claim 6 wherein said control means further comprises means for providing the processing unit with access to data contained within data sectors present in the first data storage device while other data sectors are simultaneously being transferred from the second data storage device to the first data storage device.

8. An apparatus as defined in claim 4 wherein said control means further comprises:

means for replacing data in the first data storage device with new data from the processing unit; and, means for transferring the new data into the second data storage device in the same relative position with respect to the remaining data as in the first data storage device.

9. An apparatus as defined in claim 1 wherein said control means further comprises:

means for replacing data in the first data storage device with new data from the processing unit;

means for transferring the new data into the second data storage device in the same relative position with respect to the remaining data as in the first data storage device.

10. A memory utilization apparatus for transferring data sectors between a first data storage device directly accessable to a processing unit of a computing device and a second data storage device accessable to the said processing unit through the first data storage device, comprising:

a first data storage device from which data contained within a data sector is directly accessable by said processing unit;

a second data storage device for storing data sectors and from which a data sector can be transferred to the first data storage device for access by said processing unit;

means for storing a first predetermined relationship;

control means for receiving a request from said processing unit for data and for transferring the data sector containing the requested data from the second data storage device to the first data storage device, said control means further comprising means for automatically transferring to the first data storage device, in a predetermined order, additional data sectors from the second data storage device selected according to said first predetermined relationship between the requested data sector and the additional data sectors, the requested and additional data sectors forming a first sequence of data within the first data storage device;

means for determining whether further requested data, requested by said processing unit, is contained within said first data sequence;

means for providing the processing unit with access to the first data storage device if the further requested data is contained within said first data sequence, means for storing a second predetermined relationship; and means for refilling the first data storage device with the data sector containing the further requested data and with further additional data sectors, in a predetermined order, from the second data storage device if the further requested data is not contained within said first data sequence, said further additional data sectors being automatically selected and transferred according to said second predetermined relationship between the data sector containing the further requested data and the further additional data sectors, said further requested data sector and further additional data sectors forming a second sequence of data within the first data storage device.

11. An apparatus as defined in claim 10 wherein a data sector comprises one data word.

12. A method of memory utilization for transferring data sectors between a first data storage device directly accessable to a processing unit of a computing device and a second data storage device accessable to the processing unit through the first data storage device, comprising the steps of:

receiving requests for data from the processing unit and transferring the data sector containing the requested data from the second storage device to the first data storage device;

storing a first predetermined relationship;

automatically transferring to the first data storage device, in a predetermined order, additional data sectors from the second data storage device, said additional data sectors being selected according to said first predetermined relationship between the requested data sector and the additional data sectors, the requested and additional data sectors forming a first sequence of data within the first data storage device;

determining whether further requested data, requested by said processing unit, is containing within said first data sequence;

providing the processing unit with access to the first data storage device if the further requested data is contained within said first data sequence;

storing a second predetermined relationship; and refilling the first data storage device with the data sector containing the further requested data and with further additional data sectors, in a predetermined order, from the second data storage device if the further requested data is not contained within said first data sequence, said further additional data sectors being automatically selected and transferred according to said second predetermined relationship between the data sector containing the further requested data and the further additional data sectors, said further requested and additional data sectors forming a second sequence of data within the first data storage device.

13. The method of claim 12 wherein a data sector comprises one data word.

14. A method of memory utilization for transferring data sectors between a first data storage device directly accessable to a processing unit of a computing device and a second data storage device accessable to the said processing unit through the first data storage device, comprising the steps of:

receiving a request from the processing unit for data and automatically transferring a first sequence of data from the second data storage device to the first data storage device, in the same order in which the data appears in the second data storage device, said sequence beginning with the data sector containing the requested data and ending with a data sector having an address determined so that said sequence of data will be contained in the first data storage device, the address of said beginning data sector and the address of said ending data sector forming a first set of limits;

storing said first set of limits;

monitoring the progress of the data transfer by continuously updating and storing the address of the last data sector transferred to the first data storage device throughout the transfer of the first sequence of data;

providing the processing unit with access to the requested data within the first data storage device as soon as the data sector containing the requested data is transferred to the first data storage device;

determining whether a data sector containing further requested data by said processing unit resides within the first data storage device;

providing the processing unit with access to the first data storage device if the data sector containing the further requested data resides within the first data storage device;

determining whether the further requested data is within said first set of limits and within a predetermined number of data sector addresses beyond the address of the last data sector transferred in the transfer operation;

accessing the further requested data by said processing unit after the data sector containing the further requested data is transferred to the first data storage device if the data sector containing the further requested data is within said first set of limits and within said predetermined number of data sector addresses beyond the address of the last data sector transferred in the transfer operation;

refilling the first data storage device with a second sequence of data from the second data storage device further if requested data is not contained within said first set of limits and said predetermined number of data sector addresses beyond the address of the last data sector transferred in the transfer operation; said second sequence beginning with the data sector containing the further requested data, said second sequence being transferred in the same order in which the data appears in the second data storage device, said second sequence of data ending with a data sector having an address determined so that said second sequence of data will be contained in said first data storage device, and said beginning data sector address and said refill ending data sector address forming a second set of limits;

storing said second set of limits; and, monitoring the progress of the data transfer by continuously updating and storing the address of the last data sector successfully transferred to the first data storage device throughout the transfer of the second sequence of data.

15. The method of claim 14 wherein a data sector comprises one data word.

16. The method of claim 14 further comprising the step starting said refilling regardless of whether transfer of said first data sequence has been completed.

17. The method of claim 16 further comprising the step of continually adjusting said first set of limits in the first data storage device to maintain the data sector containing the currently requested data in a predetermined position relative to other data sectors in the first data storage device.

18. The method of claim 17 further comprising the steps of:

replacing data in the first data storage device with new data from the processing unit; and transferring the new data into the second data storage device in the same relative position with respect to the remaining data as in the first data storage device.

19. The method of claim 14 further comprising the step of:

replacing data in the first data storage device with new data from the processing unit; and, transferring the new data into the second data storage device in the same relative position with respect to the remaining data as in the first data storage device.

* * * * *

UNITED STATES PATENT AND TRADEMARK OFFICE
CERTIFICATE OF CORRECTION

PATENT NO. : 4,056,848
DATED : November 1, 1977
INVENTOR(S) : George C. Gilley

It is certified that error appears in the above-identified patent and that said Letters Patent are hereby corrected as shown below:

Column 7, line 55, change "overlays" to --overlap--.
Column 8, line 53, second "ES" should be "$\overline{ES}$".
Column 11, line 8, change "in" to --is--.

Column 14, line 17, "more" should be --move--.
Column 13, line 34, "more" should be --move--.

IN THE CLAIMS

Claim 1, line 46, after "device" insert --for storing data sectors and from which a data sector can--.
Claim 1, line 66, change "process" to --progress--.
Claim 9, line 34, after "unit;" insert --and--.
Claim 12, line 26, after "to the" insert --said--.
Claim 12, line 44, change "containing" to --contained--.

Claim 19, line 6, change "step" to --steps--.

Signed and Sealed this

Fifteenth Day of August 1978

[SEAL]

Attest:

RUTH C. MASON
Attesting Officer

DONALD W. BANNER
Commissioner of Patents and Trademarks